United States Patent
Hayashi

(10) Patent No.: US 10,755,688 B2
(45) Date of Patent: Aug. 25, 2020

(54) MICROPHONE UNIT AND NOISE REDUCTION DEVICE USING SAME, AND INTEGRATED CIRCUIT COMPONENT

(71) Applicant: Panasonic Intellectual Property Management Co., Ltd., Osaka (JP)

(72) Inventor: Yoshiyuki Hayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 37 days.

(21) Appl. No.: 16/314,612

(22) PCT Filed: Jul. 10, 2017

(86) PCT No.: PCT/JP2017/025090
§ 371 (c)(1),
(2) Date: Dec. 31, 2018

(87) PCT Pub. No.: WO2018/012448
PCT Pub. Date: Jan. 18, 2018

(65) Prior Publication Data
US 2019/0251945 A1    Aug. 15, 2019

(30) Foreign Application Priority Data
Jul. 15, 2016  (JP) ................. 2016-139850

(51) Int. Cl.
*G10K 11/178* (2006.01)
*H04R 19/01* (2006.01)
(Continued)

(52) U.S. Cl.
CPC ............ *G10K 11/178* (2013.01); *B60R 11/02* (2013.01); *G10K 11/1783* (2018.01);
(Continued)

(58) Field of Classification Search
CPC .......... G10K 11/178; G10K 11/17854; G10K 11/1783; G10K 11/17883; H04R 19/016;
(Continued)

(56) References Cited

U.S. PATENT DOCUMENTS 7,812,417 B2 * 10/2010 Sawada ................. G01H 11/00
257/414
2004/0119379 A1 * 6/2004 Lee ....................... H01L 41/094
310/365
(Continued)

FOREIGN PATENT DOCUMENTS

CN     101379373 A    3/2009
EP       1990611 A1   11/2008
(Continued)

OTHER PUBLICATIONS

The Extended European Search Report dated Jun. 7, 2019 for the related European Patent Application No. 17827575.6.
(Continued)

*Primary Examiner* — Vivian C Chin
*Assistant Examiner* — Con P Tran
(74) *Attorney, Agent, or Firm* — Greenblum & Bernstein, P.L.C.

(57) ABSTRACT

A microphone unit in which a microphone body is built in a housing is provided. The microphone body detects a sound entering the housing via a sound hole of the housing. An optical detector that detects light entering the housing via the
(Continued)

sound hole is disposed in the housing. Therefore, a detection can be made that the sound hole is blocked by monitoring a detection level of the optical detector, based on a change in the detection level of the optical detector.

5 Claims, 15 Drawing Sheets

(51) Int. Cl.
  *B60R 11/02* (2006.01)
  *H04R 1/02* (2006.01)
  *H04R 3/00* (2006.01)
  *G01H 3/00* (2006.01)
  *H04R 19/04* (2006.01)

(52) U.S. Cl.
  CPC ....... *G10K 11/17883* (2018.01); *H04R 1/021* (2013.01); *H04R 3/00* (2013.01); *H04R 19/016* (2013.01); *B60R 11/0217* (2013.01); *B60R 11/0247* (2013.01); *G01H 3/00* (2013.01); *G10K 11/17854* (2018.01); *H04R 19/04* (2013.01); *H04R 2410/05* (2013.01); *H04R 2499/13* (2013.01)

(58) Field of Classification Search
  CPC .......... H04R 1/021; H04R 3/00; H04R 19/04; H04R 2410/05; H04R 2499/13; B60R 11/0217; B60R 11/0247; B60R 11/02; G01H 3/00
  USPC ..... 381/71.11, 71.4, 71.8, 94.1, 97, 86, 302, 381/365, 389; 700/28, 94; 708/322
  See application file for complete search history.

(56) References Cited

U.S. PATENT DOCUMENTS

| | | | |
|---|---|---|---|
| 2005/0285935 A1* | 12/2005 | Hodges | H04M 9/082 348/14.08 |
| 2009/0267168 A1 | 10/2009 | Sawada | |
| 2009/0297893 A1* | 12/2009 | Ito | H01M 8/04567 429/9 |
| 2016/0093283 A1 | 3/2016 | Kano | |

FOREIGN PATENT DOCUMENTS

| | | |
|---|---|---|
| JP | 2002-191089 | 7/2002 |
| JP | 2004-184315 | 7/2004 |
| JP | 2004-356925 | 12/2004 |
| JP | 2007-114239 | 5/2007 |
| JP | 3955276 B | 8/2007 |
| JP | 2009-083809 | 4/2009 |
| JP | 2009-194734 | 8/2009 |
| JP | 2014-095770 | 5/2014 |
| JP | 2016-068714 | 5/2016 |
| WO | 2007/100015 | 9/2007 |

OTHER PUBLICATIONS

International Search Report of PCT application No. PCT/JP2017/025090 dated Sep. 19, 2017.
English Translation of Chinese Search Report dated Aug. 2, 2019 for the related Chinese Patent Application No. 201780042812.4.
English Translation of the First Office Action dated Aug. 2, 2019 for the related Chinese Patent Application No. 201780042812.4.

* cited by examiner

MICROPHONE UNIT AND NOISE REDUCTION DEVICE USING SAME, AND INTEGRATED CIRCUIT COMPONENT

TECHNICAL FIELD

The present invention relates to a microphone unit to be used for detecting a noise.

BACKGROUND ART

One example of in-vehicle noises generated inside a vehicle is a "muffled sound". This sound is generated by a vibratory force that is generated by an engine rotation and is transmitted to a vehicle interior via a vehicle body or by cavity resonance in the vehicle interior. Further, another example of the in-vehicle noises is a "load noise". This noise is a vibration that is excited by unevenness of a road surface during traveling and is transmitted to the vehicle interior as a noise. In order to reduce such an uncomfortable in-vehicle noise, a noise reduction device that forms a control sound having opposite phase and equal amplitude with respect to the noise, and cancels the noise through the control sound output from a speaker is known.

Such noise reduction devices are disclosed in PTLs 1, 2, and 3. These noise reduction devices use a microphone unit to detect a noise in a vehicle interior. Microphone units are disclosed in PTLs 4 and 5.

CITATION LIST

Patent Literature

PTL 1: Unexamined Japanese Patent Publication No. 2009-83809
PTL 2: Unexamined Japanese Patent Publication No. 2016-68714
PTL 3: Unexamined Japanese Patent Publication No. 2014-95770
PTL 4: Japanese Patent No. 3955276
PTL 5: Unexamined Japanese Patent Publication No. 2009-194734

SUMMARY OF THE INVENTION

It is an object of the present invention to provide a microphone unit that can contribute to detection of a malfunction that disturbs precise detection of a noise.

The microphone unit of the present invention includes a housing having a sound hole, a microphone body that is built in the housing and detects a sound entering the housing via the sound hole, and an optical detector that is built in the housing and detects light entering the housing via the sound hole.

A noise reduction device using the microphone unit of the present invention includes a microphone unit that detects a noise in a noise-reduction target interior, and a controller that outputs a control sound for reducing a noise to the noise-reduction target interior, based on the noise detected by the microphone unit. The microphone unit includes a housing having a sound hole, a microphone body that is built in the housing and detects a sound entering the housing via the sound hole, and an optical detector that is built in the housing and detects light entering the housing via the sound hole. The controller is configured so as to operate in a normal mode when a light detection level of the optical detector is higher than or equal to a setting level, and operate in an interpolation mode when the light detection level of the optical detector is less than the setting level. In the normal mode, a control sound obtained by processing a reference signal for detecting a cause of a reduction target based on the noise detected by the microphone body is output. In the interpolation mode, a state of processing the reference signal is maintained in the normal mode just before the interpolation mode for a prescribed period.

The noise reduction device using the microphone unit of the present invention includes the microphone unit that detects a noise in the noise-reduction target interior, and the controller that outputs a control sound for reducing the noise to the noise-reduction target interior, based on the noise detected by the microphone unit. The microphone unit includes a housing having a sound hole, a microphone body that is built in the housing and that detects a sound entering the housing via the sound hole, and an optical detector that is built in the housing and detects light entering the housing via the sound hole. A light source that emits non-visible light is disposed in the noise-reduction target interior, separately from the microphone unit. The controller is configured so as to operate in a normal mode when a light detection level of the optical detector is higher than or equal to a setting level, and operate in an interpolation mode when the light detection level of the optical detector is less than the setting level. In the normal mode, a control sound obtained by processing a reference signal for detecting a cause of a reduction target based on the noise detected by the microphone body is output. In the interpolation mode, a state of processing the reference signal is maintained in the normal mode just before the interpolation mode for a prescribed period.

An integrated circuit component of the present invention includes a silicon microphone that detects a sound, and an optical detector that is disposed on a chip substrate on which the silicon microphone is disposed and detects light entering a vicinity of the silicon microphone.

In the microphone unit of the present invention, the microphone body can detect a noise entering inside the housing via the sound hole of the housing and the optical detector built in the housing can detect a state of the sound hole.

Further, in the noise reduction device using the microphone unit of the present invention, the controller that outputs a control sound for reducing a noise to the noise-reduction target interior based on the noise detected by the microphone unit is configured to operate in a normal mode when an light detection level of the optical detector is higher than or equal to the setting level, and maintains a state of processing the reference signal in the previous normal mode for a prescribed period when the light detection level of the optical detector is less than the setting level. In the normal mode, a control sound obtained by processing a reference signal for detecting a cause of a reduction target based on the noise detected by the microphone body is output. Therefore, even in a case where the sound hole of the microphone unit is blocked, sudden reduction in an operating performance and a situation that the operation becomes unstable can be avoided.

DESCRIPTION OF EMBODIMENTS

An issue in a conventional device will briefly be described prior to description of exemplary embodiments of the present invention. It is necessary to precisely detect a noise in a vehicle interior in order to provide a sufficient function to a noise reduction device. However, in a case where a sound hole that is a sound entrance of a microphone unit is blocked, an operating performance is deteriorated and the operation becomes unstable.

A specific example of such an issue includes a situation that one of passengers presses a finger against a sound hole to block the sound hole. Another example is a situation that the microphone unit is disposed on a ceiling of the vehicle interior, luggage stacked on a rear seat comes close to a front of the sound hole of the microphone unit, and thus a noise in the vehicle interior is hard to be detected.

The respective exemplary embodiments of the present invention will be described below with reference to the drawings.

Note that members that make identical effects are denoted by identical reference marks in the following description.

First Exemplary Embodiment

FIG. 1A to FIG. 4 illustrate a first exemplary embodiment of the present invention.

Figure 1A:
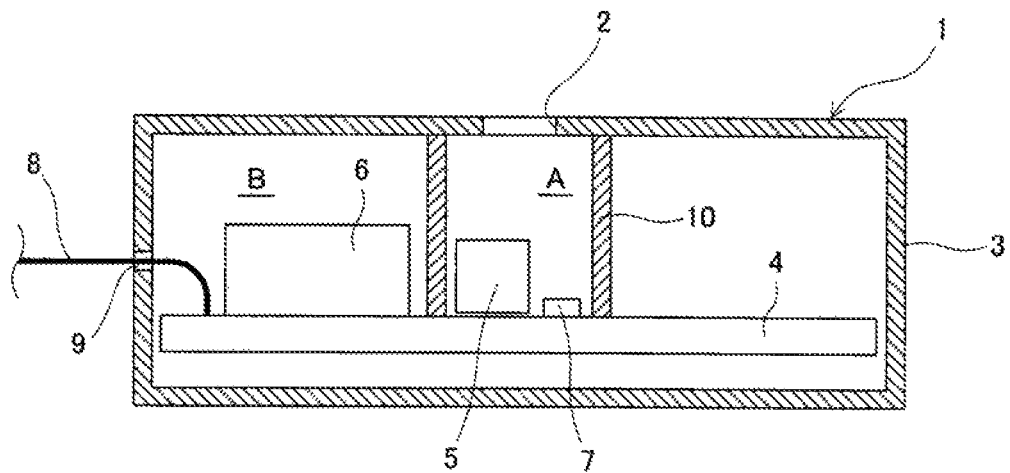
FIG. 1A is an enlarged cross-sectional view of a microphone unit according to a first exemplary embodiment.
Figure 1B:
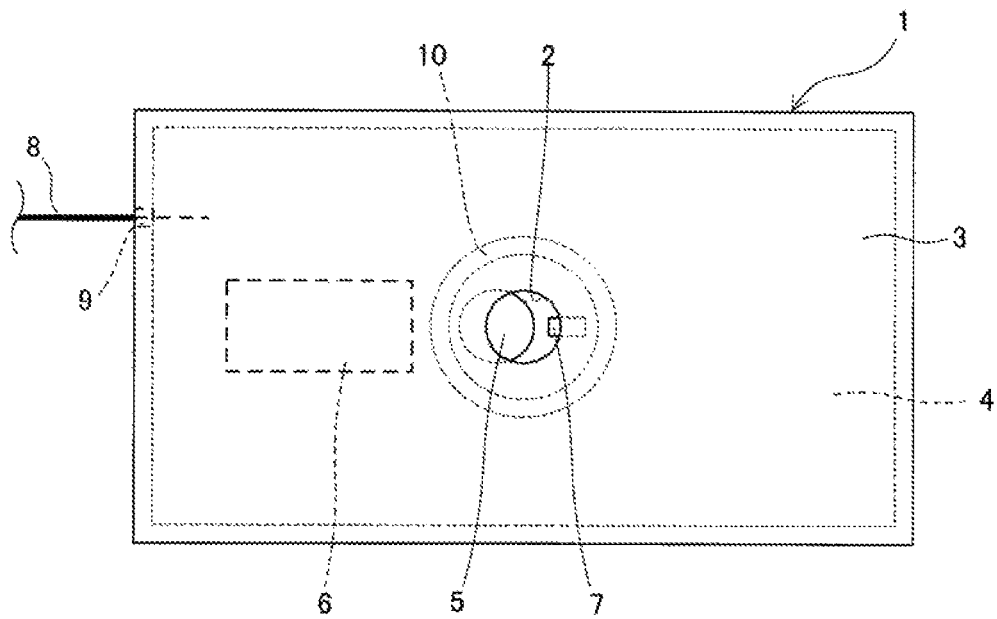
FIG. 1B is an enlarged plan view of the microphone unit according to the first exemplary embodiment.
Figure 2A:
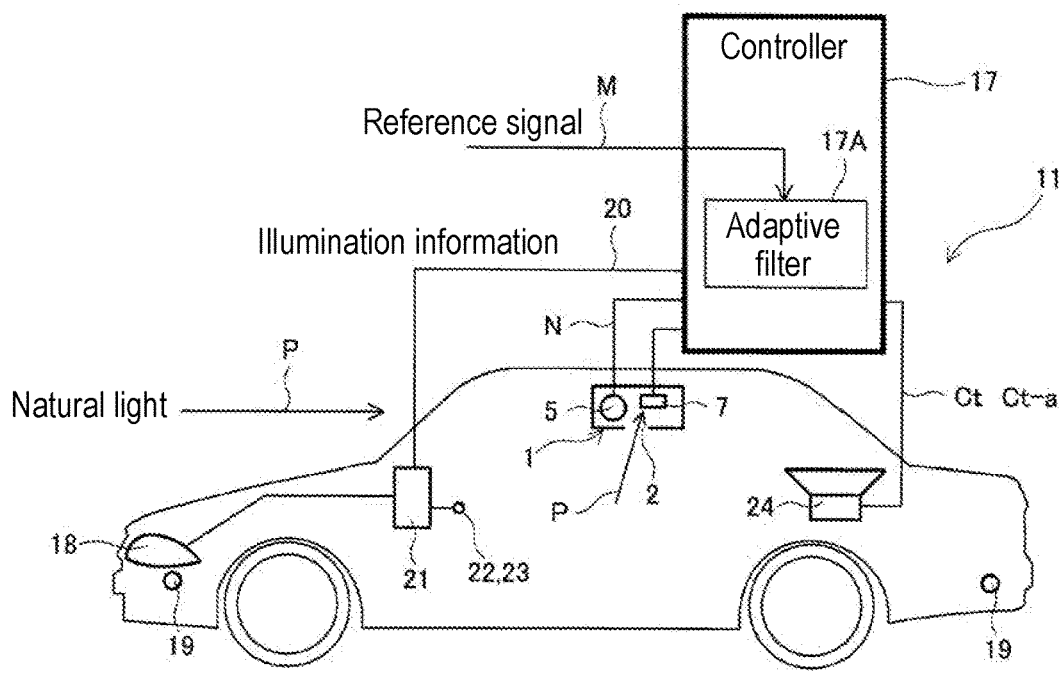
FIG. 2A is a side view illustrating a layout in a vehicle interior of a vehicle mounted with a noise reduction device according to the first exemplary embodiment.
Figure 2B:
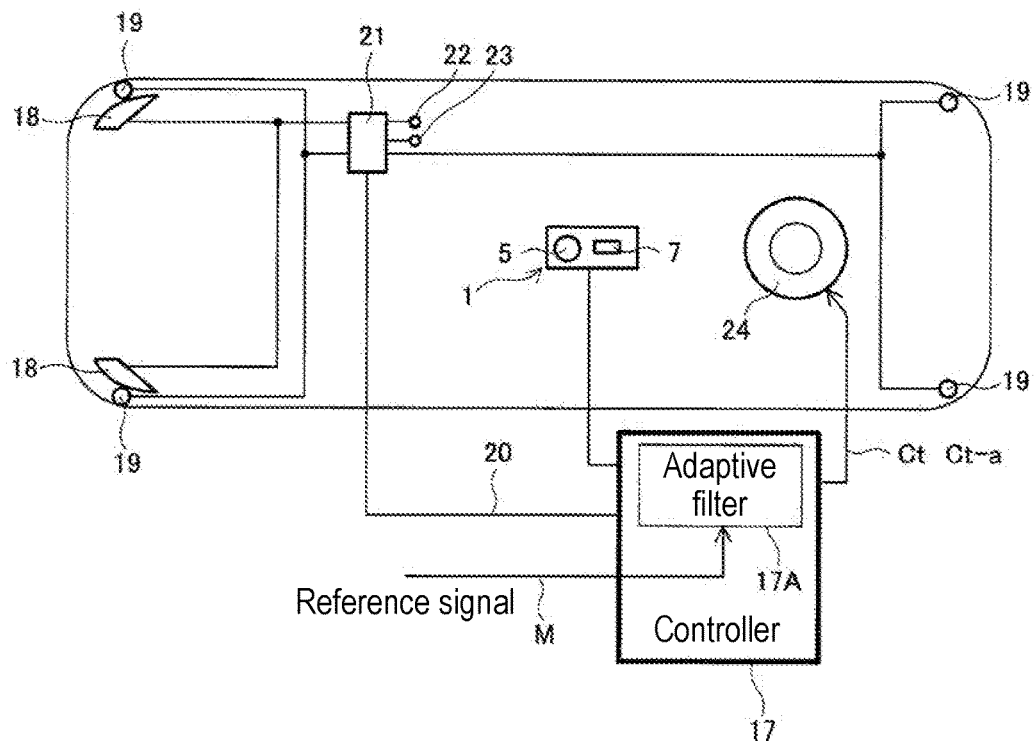
FIG. 2B is a plan view illustrating a layout in the vehicle interior of the vehicle mounted with the noise reduction device according to the first exemplary embodiment.
Figure 2C:
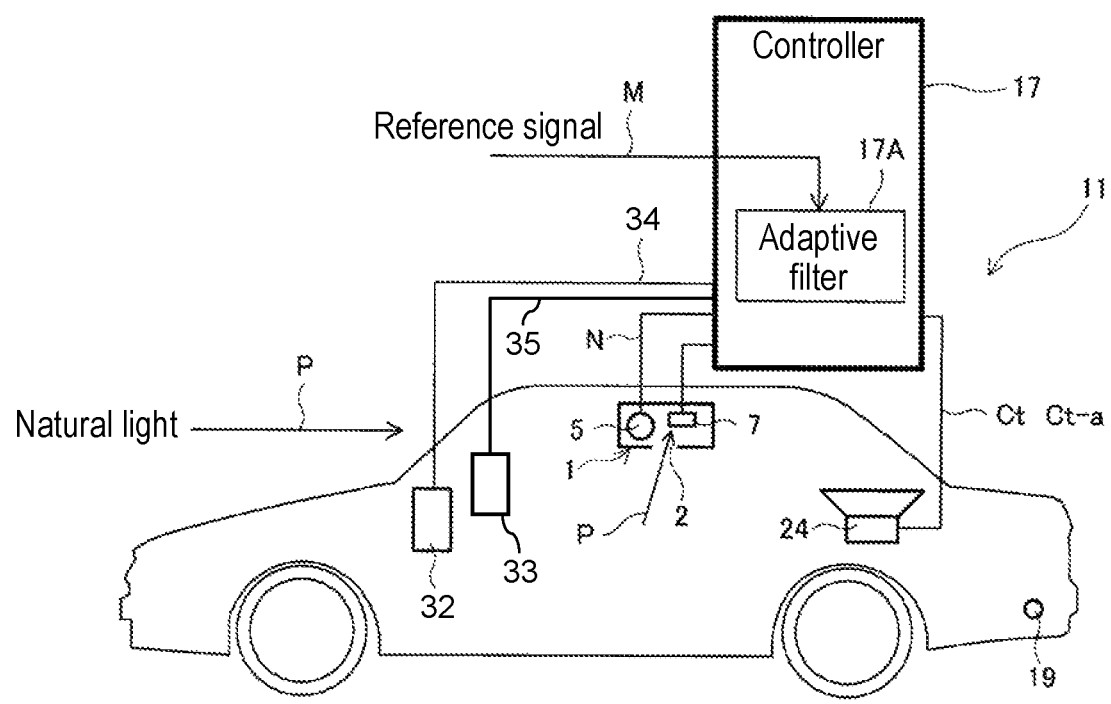
FIG. 2C is a side view illustrating a layout in the vehicle interior of the vehicle mounted with the noise reduction device according to the first exemplary embodiment.

FIG. 1A and FIG. 1B illustrate the microphone unit using the noise reduction device illustrated in FIG. 2A and FIG. 2B.

Microphone unit 1 includes housing 3 having sound hole 2, and wire substrate 4 built in housing 3. On wire substrate 4, microphone body 5, electronic circuit 6 that amplifies an output signal from microphone body 5, and optical detector 7 disposed near microphone body 5 are mounted. Electret condenser microphone (ECM) is used as microphone body 5.

Connecting wire 8 is for feeding power to wire substrate 4 and deriving the output signal from microphone body 5 to an outside. Hole 9 is a connecting wire insertion hole that is formed in housing 3. Partition 10 having a pipe shape is disposed around microphone body 5 inside housing 3. Partition 10 is disposed between an upper surface of wire substrate 4 and a rear surface of housing 3 to separate enclosed space A between sound hole 2 and microphone body 5 from enclosed space B between connecting wire insertion hole 9 and the inside of housing 3.

Figure 3:
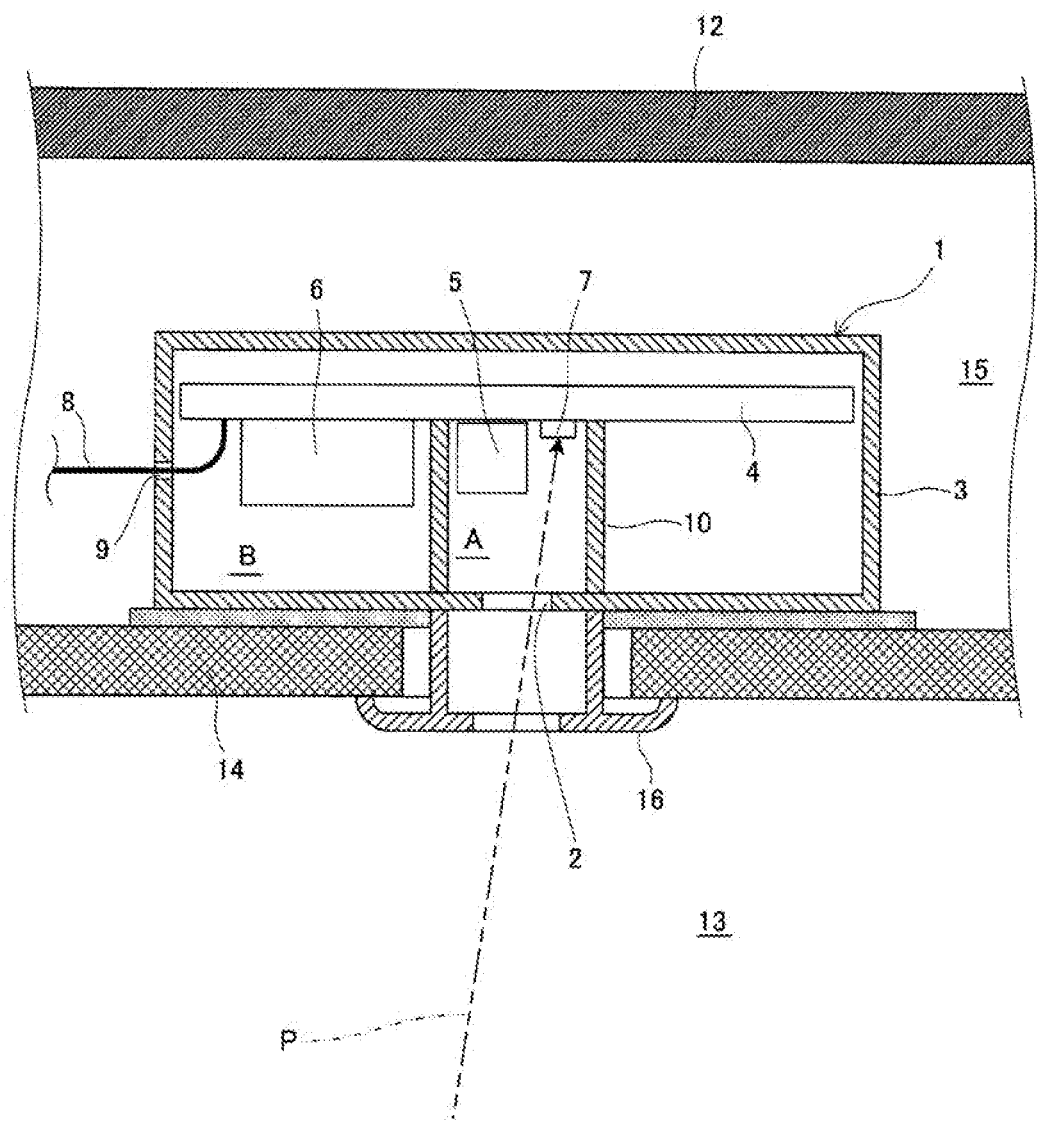
FIG. 3 is an enlarged cross-sectional view illustrating an installation state of the microphone unit according to the first exemplary embodiment.

Note that optical detector 7 is mounted on wire substrate 4, as illustrated in FIG. 3, so as to detect light P entering via sound hole 2 into housing 3. A detection signal of optical detector 7 is read outside housing 3 via connecting wire 8. The detection signal of optical detector 7 is effectively used as an input signal in noise reduction device 11 illustrated in FIG. 2A and FIG. 2B.

Specifically, as illustrated in FIG. 2A, FIG. 2B, and FIG. 3, microphone unit 1 is mounted in gap 15 provided between roof panel 12 of a vehicle and upholstery 14 of vehicle interior (noise-reduction target interior) 13 by connecting sound hole 2 to vehicle interior 13. Reference symbol 16 denotes decoration.

Control unit (hereinafter, referred to as controller) 17 of noise reduction device 11 is configured by a microcomputer as a main unit. Controller 17 receives a signal from microphone unit 1, and also illumination information 20 about headlights 18 and parking lights 19 in the present exemplary embodiment. Connecting unit 21 is for energizing or non-energizing headlights 18 and parking lights 19. Connecting unit 21 is connected to illuminating switch 22 of headlights 18, illuminating switch 23 of parking lights 19, and an automatic switch (not illustrated) for automatically turning on or off headlights 18 at a time of passing through a tunnel. Controller 17 generates control sound Ct whose level is equal in an opposite phase to a level of a noise detected by microphone body 5, and discharges control sound Ct into the vehicle interior through speaker 24. In such a manner, an engine muffled sound as a reduction target is reduced.

Note that control sound Ct is controlled appropriately by changing a function of adaptive filter 17A configured by controller 17. Adaptive filter 17A receives reference signal M as an input signal, based on a current number of engine rotations that is a cause of a muffled sound of the vehicle, processes the reference signal M and outputs the processed signal.

Figure 4:
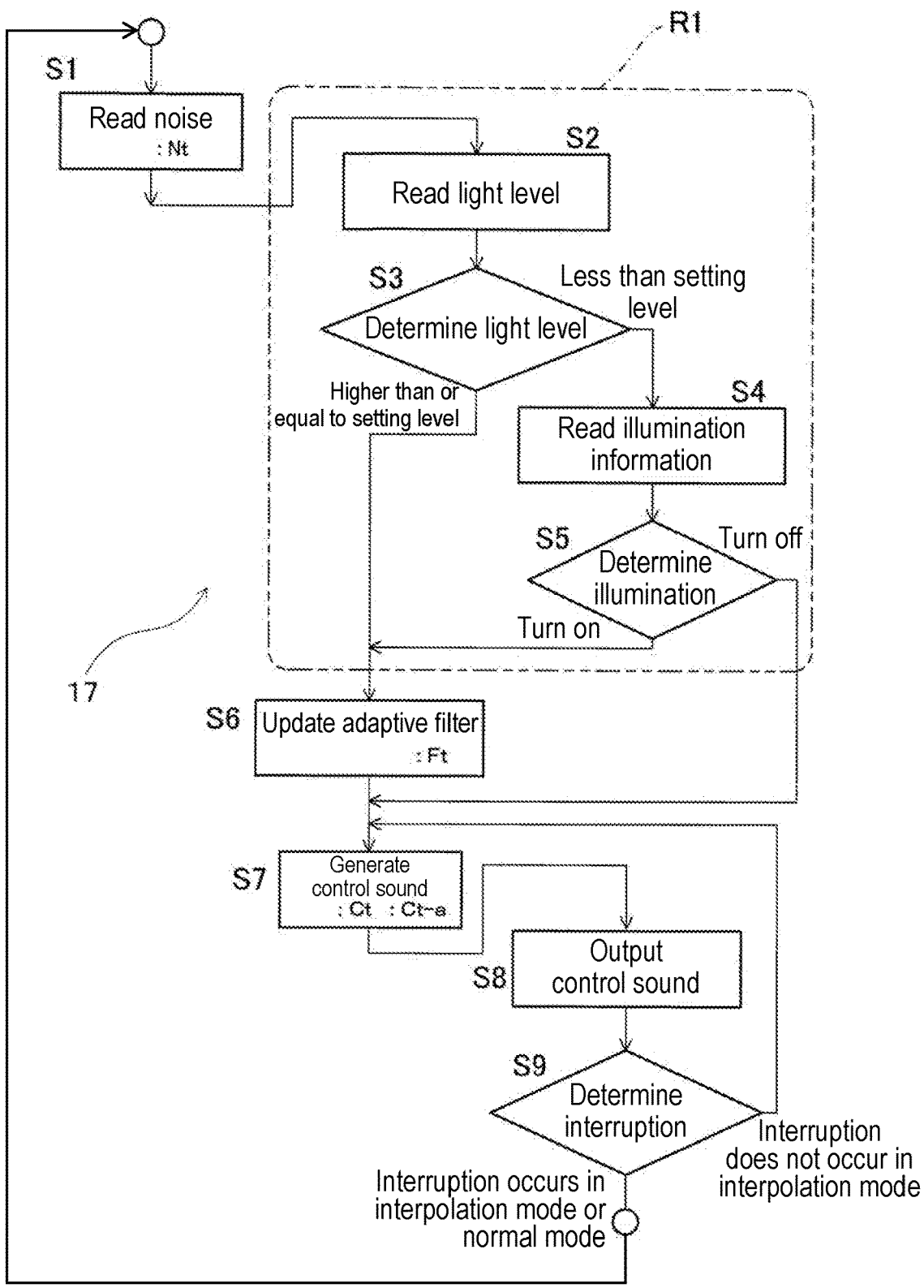
FIG. 4 is a flowchart illustrating an operation of a main unit in the noise reduction device according to the first exemplary embodiment.

Controller 17 is configured to perform an operation illustrated in FIG. 4.

In step S1, controller 17 reads noise Nt in the vehicle interior from microphone body 5 of microphone unit 1.

Controller 17 executes routine R1 configured by steps S2 to S5 to determine whether sound hole 2 is blocked. If determining that sound hole 2 is not blocked, controller 17 executes step S6.

In step S6, controller 17 determines function Ft of the adaptive filter necessary for generating latest control sound Ct based on the noise read in step S 1. In step S7 to be executed after step S6, controller 17 causes the adaptive filter of function Ft updated in step S6 to process reference signal M based on a current number of engine rotations, and to generates latest control sound Ct. In step S8, controller 17 causes speaker 24 to output control sound Ct to the vehicle interior. In this specification, this operation is referred to as a normal mode of noise reduction device 11.

In step S2 of routine R1, controller 17 reads a light level that is detected by optical detector 7 of microphone unit 1.

In step S3, controller 17 compares the light level read in step S2 with a setting level so as to determine a level. Herein, the setting level is a setting value for discriminating a case where sound hole 2 is not blocked from a case where sound hole 2 is blocked. Light enters the vehicle interior from the outside of the vehicle interior, and when sound hole 2 is blocked, a level of the light entering optical detector 7 reduces. In step S3, controller 17 determines whether the light level is higher than or equal to the setting value.

If determining in step S3 that sound hole 2 is not blocked (the light level is higher than or equal to the setting value), controller 17 executes step S6.

If determining in step S3 based on the light level read in step S2 that sound hole 2 is blocked (the light level is less than the setting value), controller 17 executes step S4.

In step S4, controller 17 reads illumination information 20. If controller 17 determines in step S5 that illumination is on, the level of light entering optical detector 7 is low because the vehicle is traveling after sunset. As a result, controller 17 determines that the noise detected in step S1 is effective, and executes step S6.

If controller 17 determines in step S5 that the illumination is on, sound hole 2 is blocked, and thus the level of the light entering optical detector 7 is low. As a result, controller 17 determines that the noise detected in step S1 is not effective, the routine skips step S6, and executes step S7. In this case, controller 17 outputs control sound Ct-a temporarily into the vehicle interior in step S8 so as to reduce an operating performance and stabilize the operation. Herein, control sound Ct-a is obtained by processing reference signal M based on a current number of engine rotations in adaptive filter 17A with the function Ft-1 previously updated in step S6, instead of the function of adaptive filter 17A in step S6 updated based on noise Nt detected in step S1. In this specification, this operation is referred to as an interpolation mode of noise reduction device 11.

Controller 17 executes step S9 after step S8. In step S9, controller 17 determines whether the microcomputer of controller 17 is interrupted during the interpolation mode. Specifically, controller 17 determines whether a prescribed time passes after a switch from the normal mode to the interpolation mode. Controller 17 does not perform the updating in step S6 until the elapsed prescribed time during the interpolation mode is detected, and repeats steps S7 and S8. If controller 17 detects the elapsed prescribed time, interruption occurs, and the routine returns to step S1.

During the normal mode in step S9, the routine skips the determination of interruption and returns to step S1.

In such a configuration, when sound hole 2 is intentionally blocked by a passenger while the vehicle is traveling in a bright environment outside the vehicle, controller 17 operates in the interpolation mode in which step S6 is not executed in routine R1. For this reason, this configuration can avoid a situation in which a passenger feels discomfort due to a malfunction caused by wrong detection of a noise.

Second Exemplary Embodiment

In the above-described exemplary embodiment, controller 17 makes the switch from the normal mode to the interpolation mode based on illumination information 20 about headlights and parking lights. However, a configuration may be set so that even if controller 17 detects decrease in the light level based on an annual calendar and a current time during traveling at night between several time periods before sunset and several time periods after sunrise, controller 17 does not make the switch to the interpolation mode.

Figure 5:
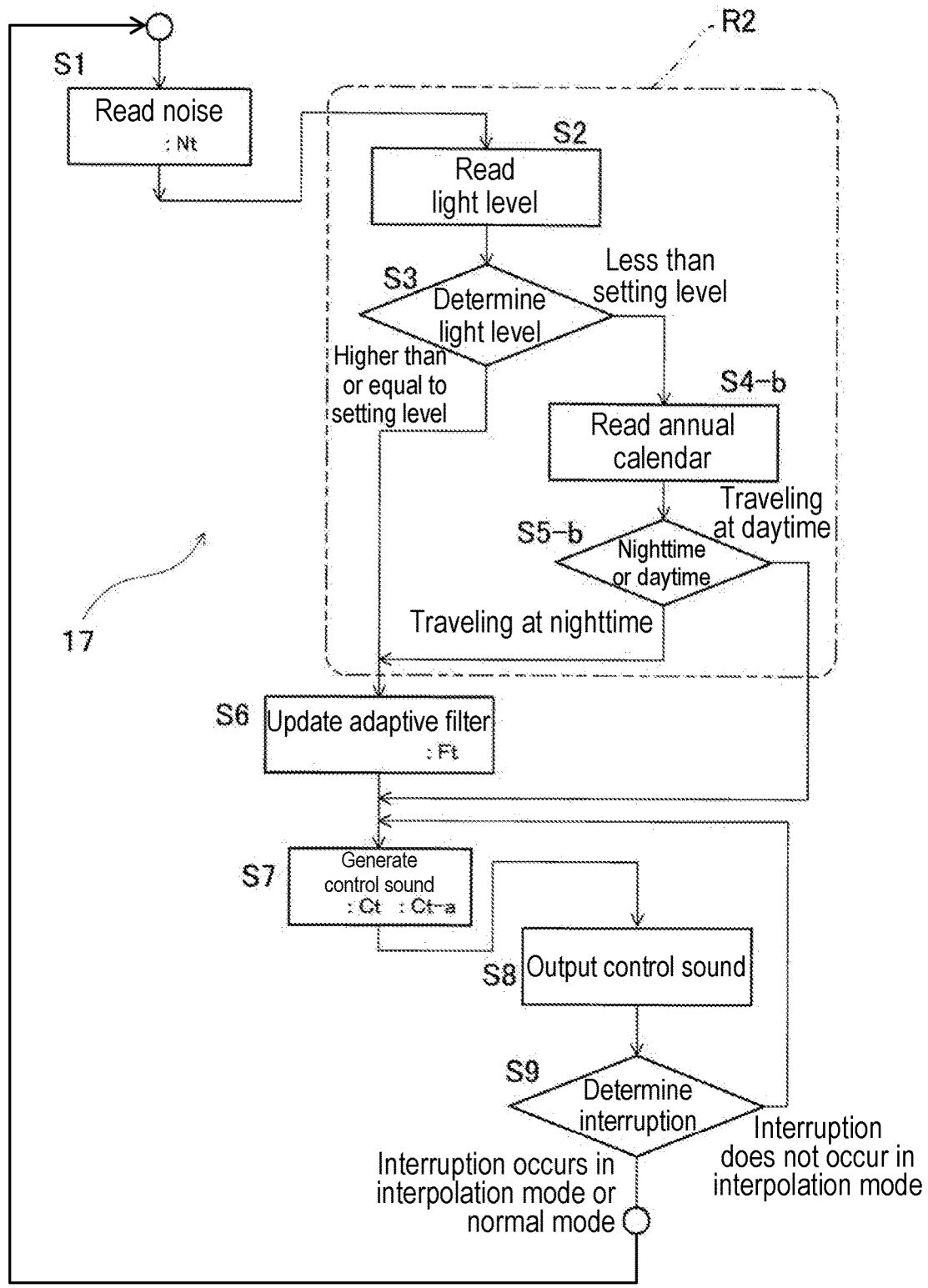
FIG. 5 is a flowchart illustrating an operation of a main unit in a noise reduction device according to a second exemplary embodiment.

FIG. 5 is a flowchart illustrating an operation of controller 17 in this case.

In the present exemplary embodiment, annual calendar 32 (illustrated in FIG. 2C) in which a sunrise time and a sunset time 34 are preset for each season in a year is connected to controller 17 separately from clock 33 that outputs current time 35.

In this case, routine R1 in FIG. 4 is replaced by routine R2 in FIG. 5. Routine R2 in FIG. 5 is equal to routine R1 in FIG. 4 except that steps S4 and S5 in FIG. 4 are replaced by steps S4-*b* and S5-*b*, respectively.

In step S4-*b*, controller 17 reads a sunrise time and a sunset time on a target day from the annual calendar based on a current date as a key.

In step S5-*b*, controller 17 compares the current time read from the clock with standard sunrise time and sunset time read in step S4-*b*, and controller 17 determines whether a current traveling environment is nighttime or daytime, based on the current time.

If determining in step S5-*b* that the current traveling environment is nighttime, controller 17 executes step S6. If determining in step S5-*b* that the current traveling environment is daytime, controller 17 skips step S6 and executes step S7.

In such a configuration, when sound hole 2 is intentionally blocked by a passenger during the traveling at the daytime in which the outside of the vehicle is estimated to be bright based on the sunrise time and the sunset time read from the annual calendar, controller 17 operates in the interpolation mode in which step S6 in routine R2 is not executed. For this reason, this mode can avoid a situation in which the passenger feels discomfort due to malfunction caused by wrong detection of a noise.

Third Exemplary Embodiment

In the above-described exemplary embodiments, a signal of one microphone unit 1 is used as an input signal to controller 17, but in a third exemplary embodiment, signals of a plurality of microphone units are used as input signals to controller 17, and the traveling at the nighttime is discriminated from the traveling at the daytime based on detection by the optical detectors built in the microphone units.

Figure 6:
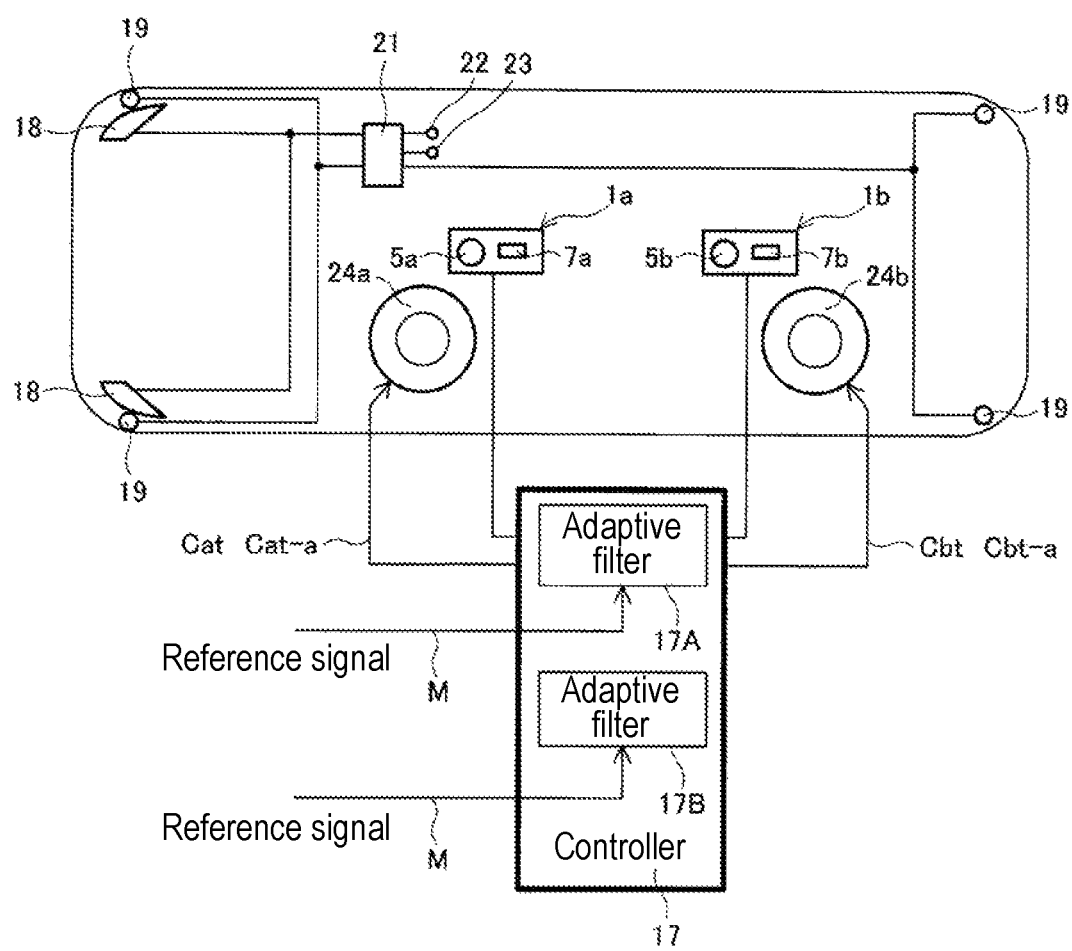
FIG. 6 is a plan view illustrating a layout in a vehicle interior of a noise reduction device according to a third exemplary embodiment.
Figure 7:
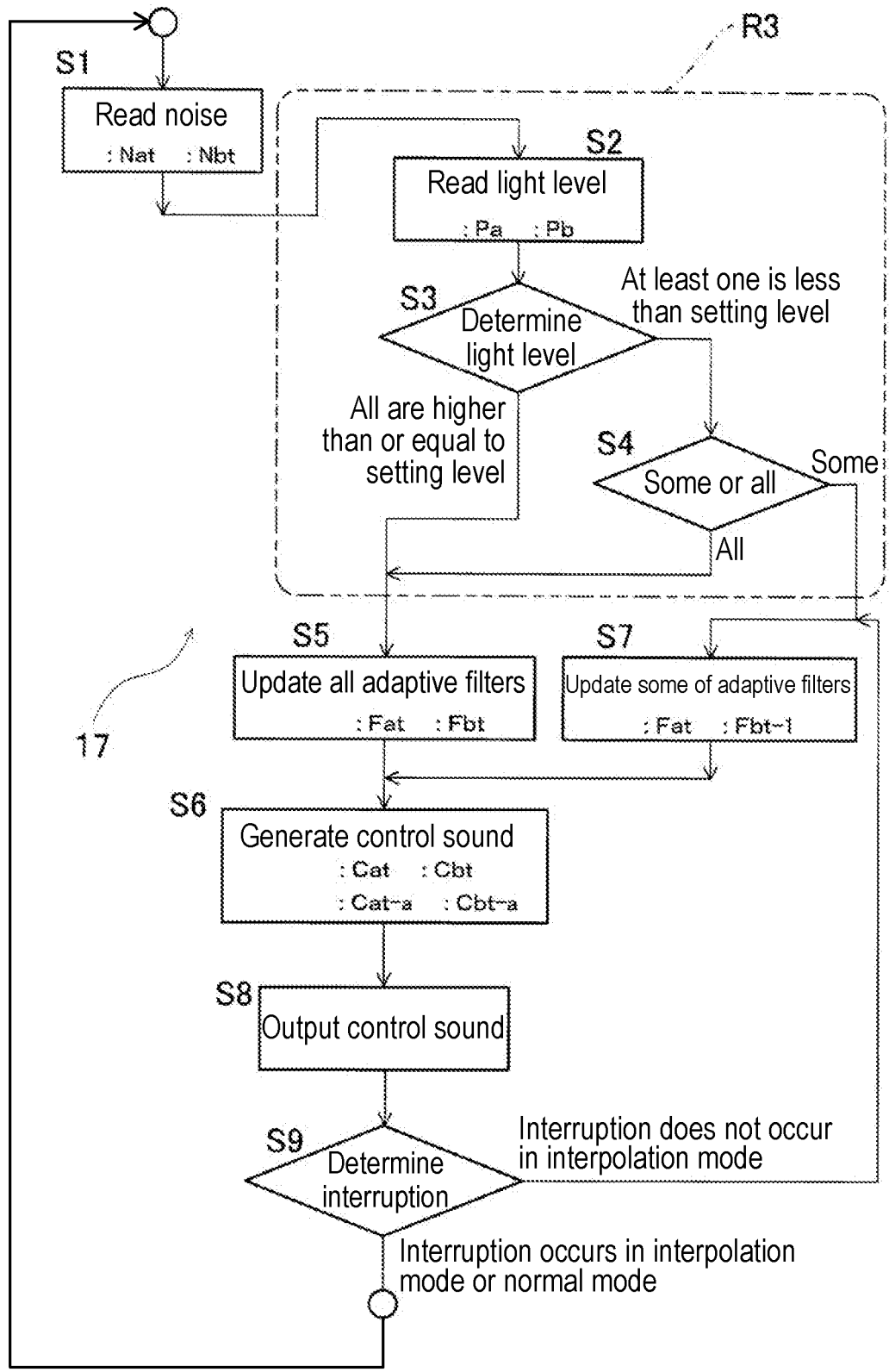
FIG. 7 is a flowchart illustrating an operation of a main unit in the noise reduction device according to the third exemplary embodiment.

FIG. 6 and FIG. 7 illustrate the third exemplary embodiment of the present invention.

As illustrated in FIG. 6, controller 17 is connected to two microphone units 1a, 1b, and two speakers 24a, 24b. Controller 17 includes adaptive filters 17A, 17B. Adaptive filters 17A, 17B process reference signals M as input signals, respectively, based on a current number of engine rotations to output the processed signals. Configurations of microphone units 1a, 1b are equal to the configuration in the first exemplary embodiment. Installation states of microphone units 1a, 1b are also equal to that in FIG. 3, and microphone units 1a, 1b are installed so that sound holes 2 face the vehicle interior.

Speaker 24a is installed in the vehicle interior so as to output a control sound to a detection area of microphone unit 1a. Speaker 24b is installed in the vehicle interior so as to output a control sound to a detection area of microphone unit 1b.

Controller 17 is configured to perform an operation illustrated in FIG. 7.

In step S1, controller 17 reads noise output Nat from microphone body 5a of microphone unit 1a and noise output Nbt from microphone body 5b of microphone unit 1b separately from each other.

Controller 17 executes routine R3 including steps S2 to S4, and determines whether sound hole 2 of microphone units 1a, 1b are blocked. Controller 17 executes steps S5, S6, and S8, or steps S7, S6, and S8 based on the determination in routine R3, and outputs the control sounds from speakers 24a, 24b into the vehicle interior, respectively.

In step S2 of routine R3, controller 17 reads light level Pa detected by optical detector 7a of microphone unit 1a and light level Pb detected by optical detector 7b of microphone unit 1b separately from each other.

In step S3, controller 17 compares the setting level with light levels Pa, Pb read in step S2, and determines a level. Natural light enters from the outside of the vehicle into the vehicle interior during traveling at the daytime between several time periods after sunrise and several time periods before sunset. In a case where sound hole 2 is blocked, levels of light entering optical detectors 7a, 7b are decreased.

If both light levels Pa, Pb read in step S2 are higher than the setting level, in step S3, controller 17 determines that the vehicle is traveling at the daytime and both sound holes 2, 2 are not blocked. Controller 17 then executes step S5.

In step S5, controller 17 determines function Fat of adaptive filter 17A necessary for generating latest control sound Ct based on latest noise output Nat read in step S1. Further, controller 17 determines function Fbt of adaptive filter 17B necessary for generating latest control sound Cbt based on latest noise output Nbt.

If executing step S6 after step S5, in step S6, controller 17 causes adaptive filters 17A, 17B with functions Fat, Fbt updated in step S6 to process reference signal M based on a current number of engine rotations and generates latest control sounds Cat, Cbt. In step S8, controller 17 causes speakers 24a, 24b to output control sounds Ct, Cbt to the vehicle interior. In this specification this operation is referred to as the normal mode of noise reduction device 11.

In step S3, if determining that at least any of light levels Pa, Pb is low, controller 17 executes step S4.

In step S4, controller 17 determines whether the light level is low in any of or all of microphone units 1a, 1b. If the light level is low in any of the microphone units, controller 17 determines that the sound hole of the microphone unit with the low light level is blocked. Then controller 17 executes step S7.

In step S7, controller 17 determines in step S4 that light level Pa is high and light level Pb is low, namely, sound hole 2 of microphone unit 1b is blocked, controller 17 determines function Fat of adaptive filter 17A necessary for generating latest control sound Ct based on latest noise output Nat read in step S1. Further, controller 17 does not update function Fbt of adaptive filter 17B and maintains previous function Fbt-1 based on latest noise output Nbt. In step S6 to be executed after step S7, controller 17 generates latest control sound Cat and control sound Cbt-a. Control sound Cat is obtained by processing reference signal M based on a current number of engine rotations in adaptive filter 17A with function Fat. Control sound Cbt-a is obtained by processing reference signal M based on a current number of engine rotations in adaptive filter 17B with previous adaptive filter Fbt-1.

In such a manner, controller 17 does not update the control sound to be output from speaker 24b in step S8 to latest control sound Cbt generated based on latest noise output Nbt, and outputs control sound Cbt-a obtained by processing reference signal M based on a current number of engine rotations with previous function Fbt-1 to the vehicle interior.

In this specification, a case where steps S7, S6, and S8 are executed is referred to as the interpolation mode of noise reduction device 11.

Further, when determining in step S4 that light level Pa is low and light level Pb is high, namely, sound hole 2 of microphone unit 1a is blocked, in step S7, controller 17 does not update function Fat of adaptive filter 17A but maintains previous function Fat-1 and updates function Fbt of adaptive filter 17B. In step S6, controller 17 generates control sound Cat-a obtained by processing reference signal M based on a current number of engine rotations in adaptive filter 17A with previous adaptive filter Fat-1, and control sound Cbt obtained by processing in adaptive filter 17B with function Fbt. In step S8, controller 17 outputs these control sounds and executes the interpolation mode.

Further, if controller 17 determines in step S4 that light level Pa of microphone unit 1a is low and light level Pb of microphone unit 1b is also low, namely, the traveling environment of the vehicle is traveling at the nighttime, controller 17 operates in the normal mode in which steps S5, S6, and S8 are executed.

Controller 17 executes step S9 after step S8. Controller 17 determines in step S9 whether the microcomputer of controller 17 is interrupted during the interpolation mode. Specifically, controller 17 determines whether a prescribed time passes after the switch from the normal mode to the interpolation mode is made. Controller 17 executes step S7 in which only any adaptive filter is updated until the elapsed prescribed time is detected during the interpolation mode. Controller 17 then executes steps S6 and S8, and when the elapsed prescribed time is detected, interruption occurs, and the routine returns to step S1.

During the normal mode, in step S9, the routine skips the determination of interruption and returns to step S1.

In such a configuration, sound holes 2 of microphone units 1a, 1b are intentionally blocked by a passenger during the traveling, controller 17 operates in the interpolation mode. For this reason, this configuration can avoid a situation in which a passenger feels discomfort due to malfunction caused by wrong detection of a noise. Alternatively, if only any one of light level Pa, Pb is less than the setting level, controller 17 can operate in the normal mode in which a noise detected by the microphone in which the determination is made that any of light level Pa, Pb is less than the setting level is set to 0.

Fourth Exemplary Embodiment

In the above-described exemplary embodiments, the optical detector has detected the natural light entering the vehicle interior. However, in a case where the optical detector detects non-visible light (infrared light) emitted into the vehicle interior, the controller of the noise reduction device can make the switch between the normal mode and the interpolation mode without the illumination information about headlights and parking lights, the preset annual calendar, and the plurality of microphone units.

Figure 8:
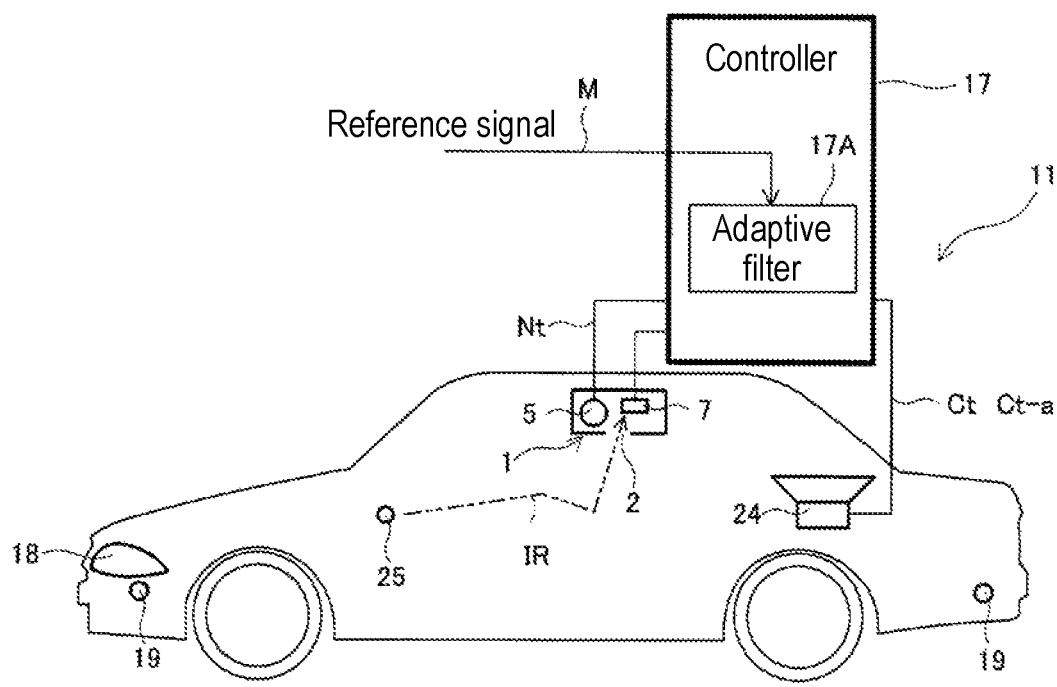
FIG. 8 is a side view illustrating a layout in a vehicle interior in a noise reduction device according to a fourth exemplary embodiment.
Figure 9:
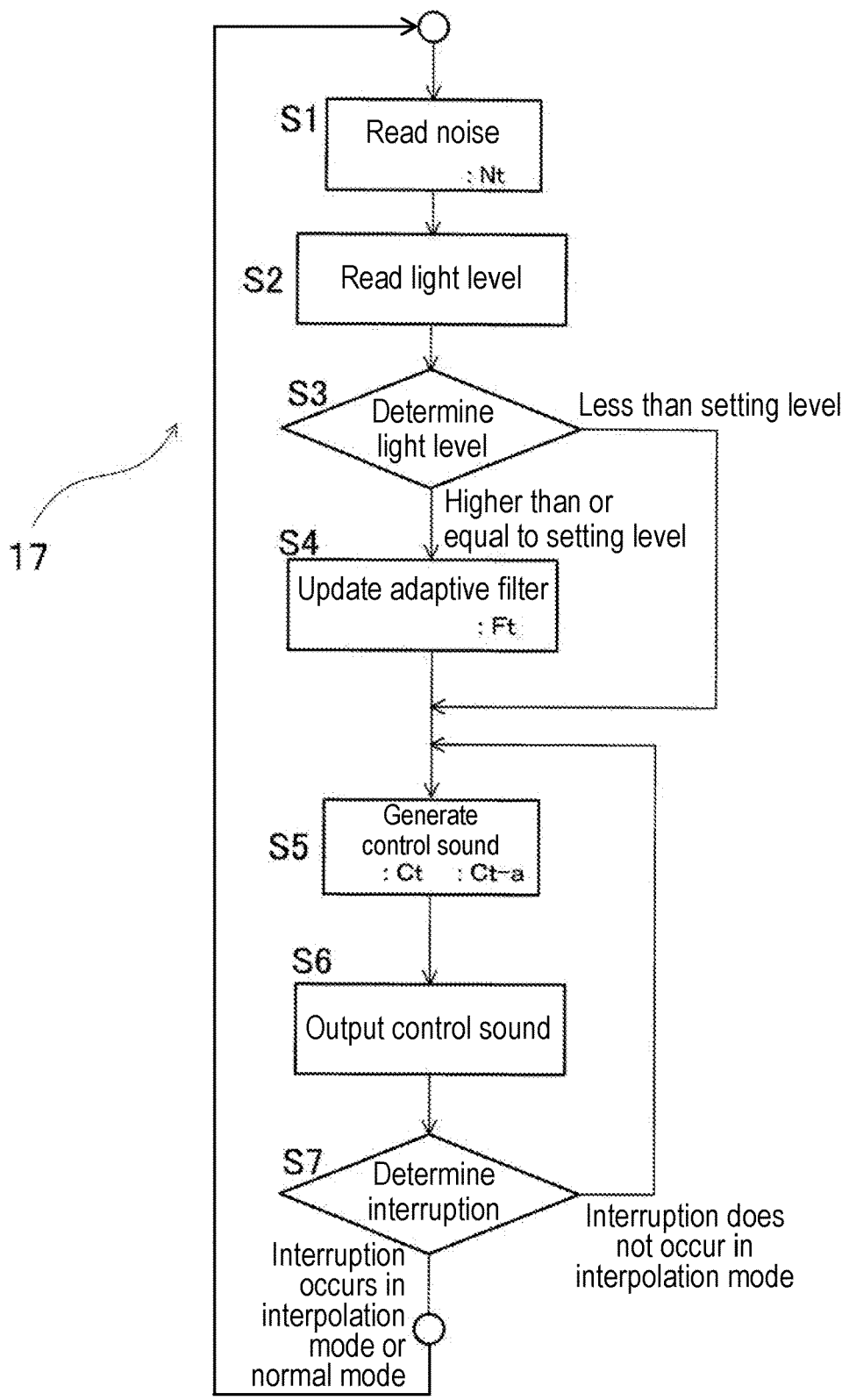
FIG. 9 is a flowchart illustrating an operation of a main unit in the noise reduction device according to the fourth exemplary embodiment.

FIG. 8 and FIG. 9 illustrate a fourth exemplary embodiment of the present invention.

In the fourth exemplary embodiment, as illustrated in FIG. 8, light-emitting diode 25 as a light source is disposed on a dashboard, and continuously emits infrared rays IR as non-visible light toward the vehicle interior. Microphone unit 1 is equal to microphone unit 1 described in the first exemplary embodiment with reference to FIG. 1A and FIG. 1B, and similarly to FIG. 3, sound hole 2 is provided in gap 15 between roof panel 12 of the vehicle and upholstery 14 of the vehicle interior so as to be connected to vehicle interior 13. Detection sensitivity of optical detector 7 of microphone unit 1 is adjusted so that infrared rays IR are detected, and detection sensitivity for the other wavelengths is adjusted to be low.

Controller 17 is configured to perform an operation illustrated in FIG. 9.

In step S1, controller 17 reads noise output Nt from microphone body 5 of microphone unit 1.

In step S2, optical detector 7 detects a light level of infrared light IR that is emitted from light-emitting diode 25 and enters sound hole 2 directly or is reflected from the vehicle interior to enter sound hole 2.

In step S3, controller 17 compares the setting level with the light level read in step S2 to determine the level. Herein, the setting level is a setting value for discriminating the case where sound hole 2 is not blocked from the case where sound hole 2 is blocked. In the case where sound hole 2 is blocked, the level of the light entering optical detector 7 is decreased. In step S3, controller 17 determines whether the light level is higher than or equal to the setting value.

If determining in step S3 that sound hole 2 is not blocked (the light level is higher than or equal to the setting level), controller 17 executes step S4.

In step S4, controller 17 determines function Ft of the adaptive filter necessary for generating latest control sound Ct based on the noise read in step S1. If executing step S5 after step S4, in step S5, controller 17 generates latest control sound Ct processed by the adaptive filter with function Ft updated in step S4. In step S6, controller 17 causes speaker 24 to output control sound Ct to the vehicle interior. In this specification, this operation is referred to as the normal mode of noise reduction device 11.

If controller 17 determines in step S3 that sound hole 2 is blocked (the light level is less than the setting level), controller 17 skips step S4 and executes step S5. That is, since sound hole 2 is blocked, controller 17 determines that the noise detected in step Si is not effective, skips step S4, and executes step S5. In this case, controller 17 temporarily outputs control sound Ct-a into the vehicle interior in step S6 so as to decrease an operating performance and stabilize the operation. Herein, control sound Ct-a is obtained by processing reference signal M based on a current number of engine rotations in adaptive filter 17A with the function Ft-1 previously updated in step S4, instead of the function of adaptive filter 17A in step S4 updated based on noise Nt detected in step S1. In this specification, this operation is referred to as the interpolation mode of noise reduction device 11.

Step S7 is executed after step S6. Controller 17 determines in step S7 whether the microcomputer of controller 17 is interrupted during the interpolation mode. Specifically, controller 17 determines whether a prescribed time passes after the switch from the normal mode to the interpolation mode. Controller 17 does not perform the updating in step S4 until the elapsed prescribed time is detected during the interpolation mode, and repeats steps S5 and S6. If controller 17 detects the elapsed prescribed time, interruption occurs, and the routine returns to step S1.

In such a configuration, when sound hole 2 is intentionally blocked by a passenger, controller 17 operates in the interpolation mode in which step S4 is not executed. For this reason, this configuration can avoid a situation in which a passenger feels discomfort due to malfunction caused by wrong detection of a noise.

Note that the emitted light from light-emitting diode 25 is modulated by a specific code or signal, only a component including the specific code or signal is processed as an effective component at the time of reading the light level and the determination of the light level in steps S3 and S4. As a result, various influences of the light in the vehicle interior can be reduced, and thus improvement of reliability can be expected.

Note that light-emitting diode 25 is disposed on the dashboard, but a placement position is not limited to the dashboard. Various measuring instruments, a display, and a display of an audio device that are mounted to the dashboard or other places and emit light toward the vehicle interior may be used as the light source instead of light-emitting diode 25. Alternatively, a substitute light source that emits light with a plurality of bands for visible light and non-visible light may be used.

Fifth Exemplary Embodiment

In the above exemplary embodiments, the microphone unit includes the microphone body and the optical detector, but the microphone unit may include a light source that emits light from the microphone unit toward the outside through the sound hole besides the optical detector. This configuration enables the optical detector to receive the light that passes through the sound hole and is reflected to the inside of the microphone unit when the sound hole is blocked or a similar malfunction occurs.

Figure 10:
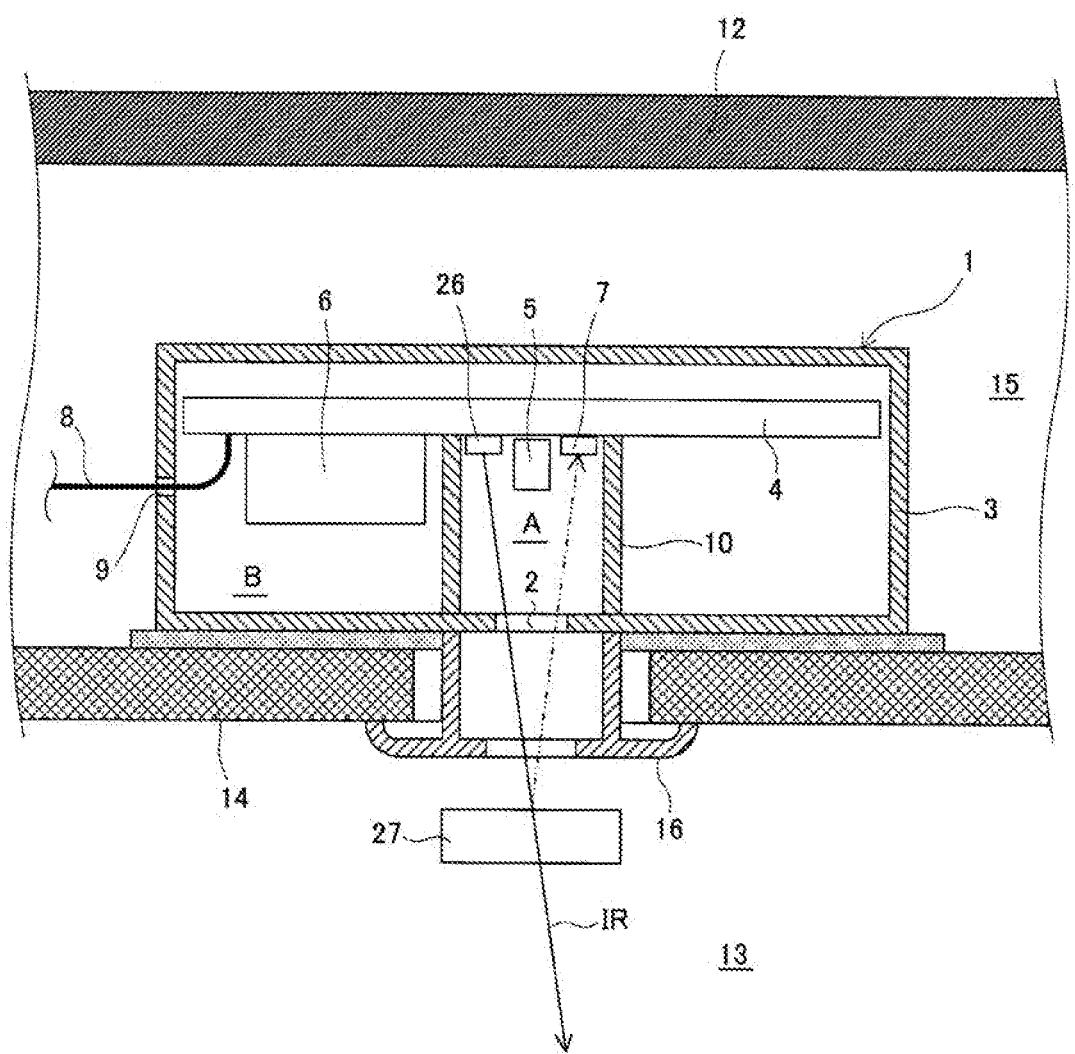
FIG. 10 is an enlarged cross-sectional view illustrating a microphone unit according to a fifth exemplary embodiment.
Figure 11:
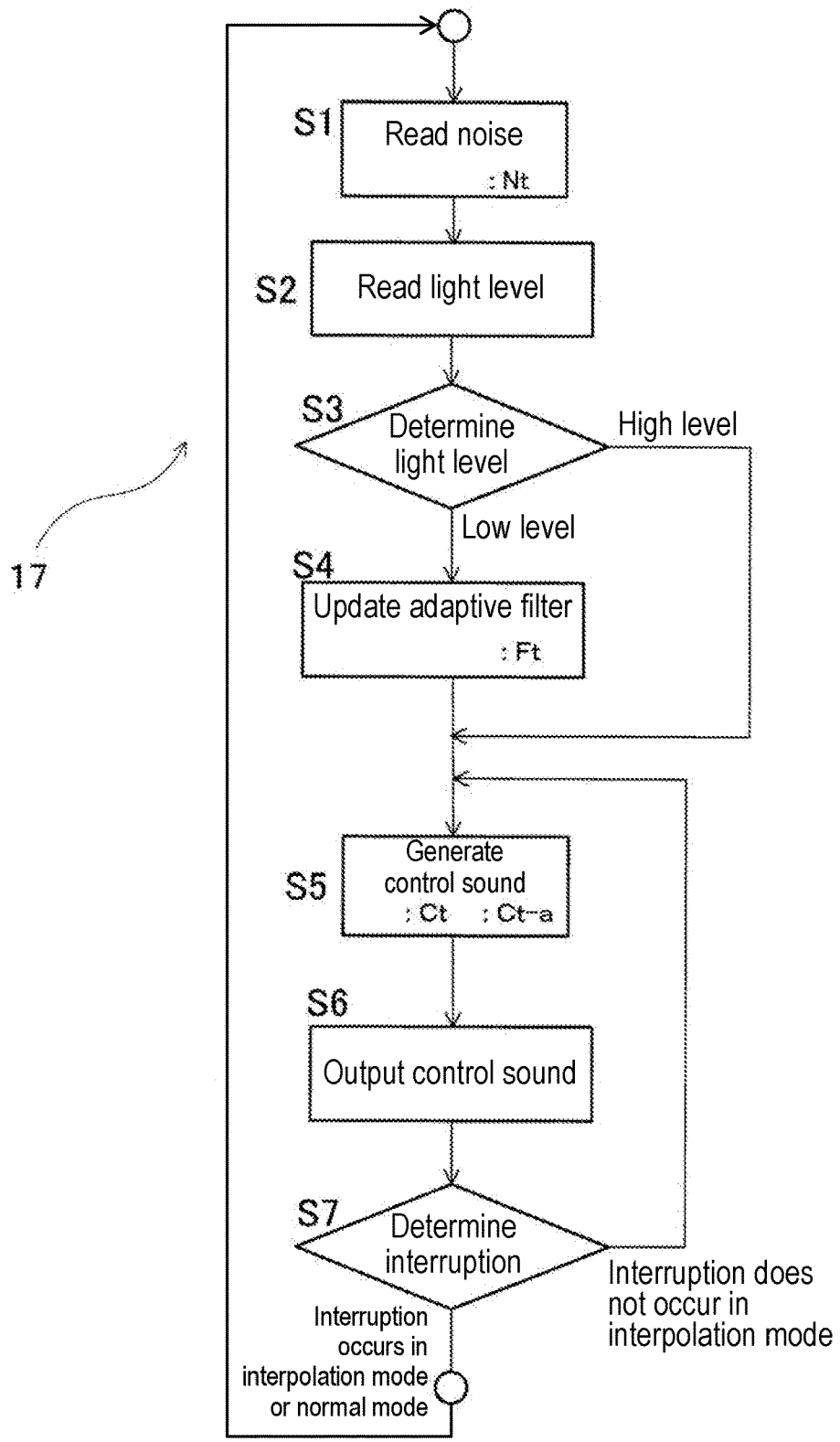
FIG. 11 is a flowchart illustrating an operation of a main unit in a noise reduction device according to the fifth exemplary embodiment.

FIG. 10 and FIG. 11 illustrate a fifth exemplary embodiment of the present invention.

In the fifth exemplary embodiment, as illustrated in FIG. 10, light-emitting diode 26 as the light source is mounted on wire substrate 4 of microphone unit 1, and continuously emits infrared rays IR as non-visible light toward the vehicle interior. The other parts of microphone unit 1 are similar to the configuration in FIG. 1A, FIG. 1B, and FIG. 3 according to the first exemplary embodiment. The detection sensitivity of optical detector 7 of microphone unit 1 is adjusted so that infrared rays IR are detected, and detection sensitivity for the other wavelengths is adjusted to be low.

Controller 17 is configured to perform an operation illustrated in FIG. 11.

In step Si, controller 17 reads noise output Nt from microphone body 5 of microphone unit 1.

In step S2, controller 17 reads light level Pt, detected by optical detector 7, of the light emitted from light-emitting diode 26 via sound hole 2 to the vehicle interior.

Specifically, in a case where obstacle 27 of the vehicle interior does not exist near sound hole 2, the light emitted from light-emitting diode 26 is not detected by optical detector 7. Alternatively, even if the light is repeatedly reflected in the vehicle interior and enters microphone unit 1 via sound hole 2, the light level is very low.

In a case where obstacle 27 in the vehicle interior appears near sound hole 2, the light emitted from light-emitting diode 26 is reflected from obstacle 27 and enters microphone unit 1 via sound hole 2. For this reason, the light level is very high.

In step S3, controller 17 compares the light level read in step S3 with the setting level, and determines whether the light level read in step S3 is low or high. If determining that the read light level is low, controller 17 executes step S4.

In step S4, controller 17 determines function Ft of the adaptive filter necessary for generating latest control sound Ct based on the noise read in step S1. If step S5 is executed after step S4, in step S5, controller 17 generates latest control sound Ct processed by the adaptive filter with function Ft updated in step S4. In step S6, controller 17 causes speaker 24 to output control sound Ct to the vehicle interior. In this specification, this operation is referred to as the normal mode of noise reduction device 11.

If determining in step S3 that the read light level is high, controller 17 skips step S4, and executes step S5. That is, since sound hole 2 is blocked or nearly blocked, controller 17 determines that the noise detected in step S1 is not effective, skips step S4, and executes step S5. In this case, controller 17 temporarily outputs control sound Ct-a into the vehicle interior in step S6 so as to decrease an operating performance and stabilize the operation. Herein, control sound Ct-a is obtained by processing reference signal M based on a current number of engine rotations in adaptive filter 17A with the function Ft-1 previously updated in step S4, instead of the function of adaptive filter 17A in step S4 updated based on noise Nt detected in step S1. In this specification, this operation is referred to as the interpolation mode of noise reduction device 11.

Step S7 is executed after step S6. Controller 17 determines in step S7 whether the microcomputer of controller 17 is interrupted during the interpolation mode. Specifically, controller 17 determines whether a prescribed time passes after the switch from the normal mode to the interpolation mode. Controller 17 does not perform the updating in step S4 until the elapsed prescribed time is detected during the interpolation mode, and repeats steps S5 and S6. If controller detects the elapsed prescribed time, interruption occurs, and the routine returns to step S1.

In such a configuration, when sound hole 2 is intentionally blocked by a passenger, controller 17 operates in the interpolation mode in which step S4 is not executed. For this reason, this configuration can avoid a situation in which a passenger feels discomfort due to malfunction caused by wrong detection of a noise.

Sixth Exemplary Embodiment

In the above exemplary embodiments, the microphone unit is configured so that microphone body 5, electronic circuit 6 that amplifies an output signal from microphone body 5, and optical detector 7 that is provided near microphone body 5 are mounted on wire substrate 4. However, in a case where microphone body 5 is configured by employing a publicly-known micro-electromechanical system technique, assemblability of the microphone unit can be improved, and the housing of the microphone unit can be downsized. As a result, an option for mounting places of the microphone unit can be expected to be broadened.

FIG. 12A, FIG. 12B, FIG. 13A, FIG. 13B, and FIG. 13C illustrate a sixth exemplary embodiment of the present invention.

Figure 12A:
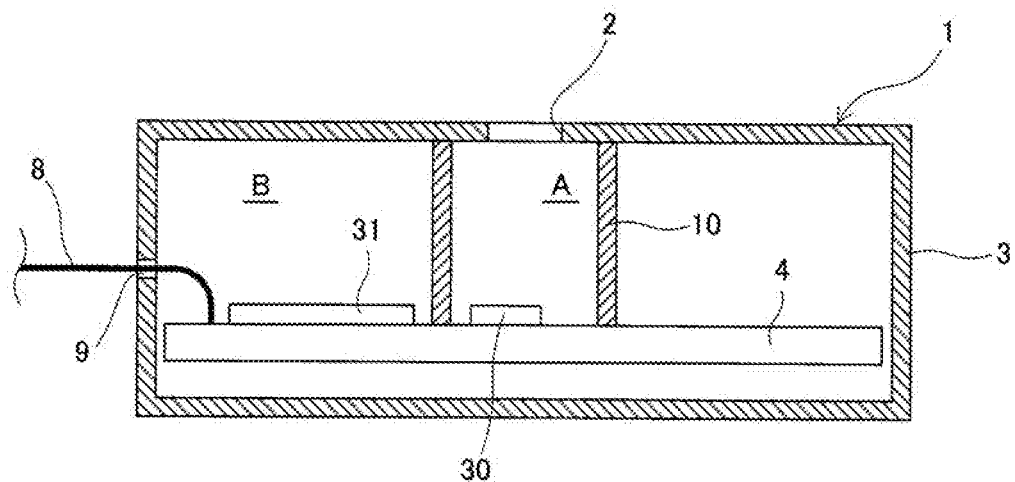
FIG. 12A is an enlarged cross-sectional view illustrating a microphone unit according to a sixth exemplary embodiment.
Figure 12B:
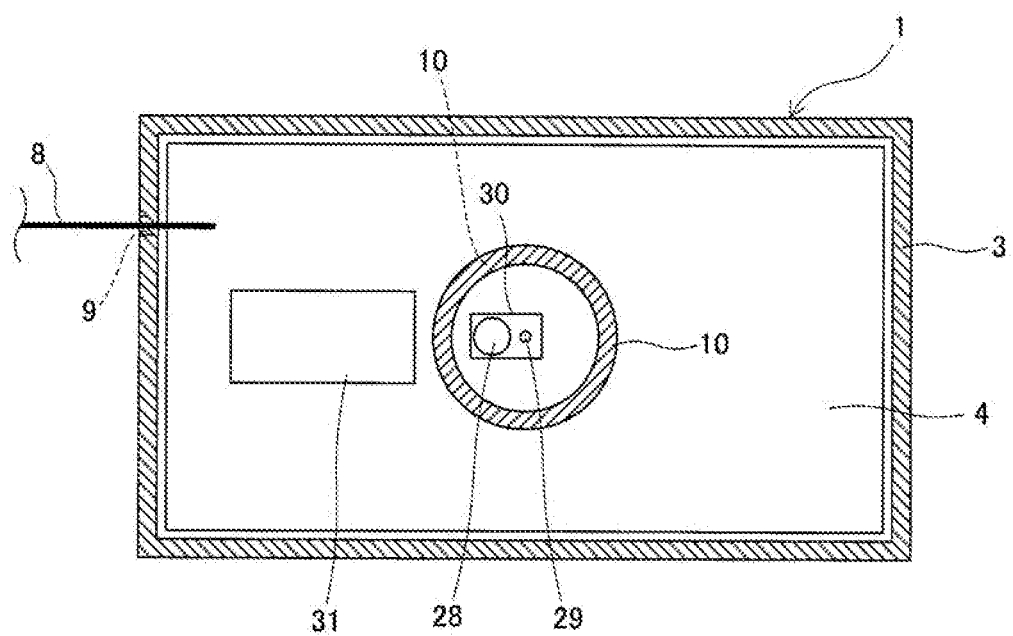
FIG. 12B is a horizontal cross-sectional view illustrating the microphone unit according to the sixth exemplary embodiment.

As illustrated in FIG. 12A and FIG. 12B, microphone unit 1 includes housing 3 having sound hole 2, and wire substrate 4 built in housing 3. Silicon microphone 28 as microphone body 5, first integrated circuit component 30, and second integrated circuit component 31 are mounted on wire substrate 4. Silicon microphone 28 is formed on a chip substrate by a semiconductor process employing the MEMS technique. First integrated circuit component 30 is configured so that phototransistor 29 as optical detector 7 is formed on the chip substrate on which silicon microphone 28 is formed. Second integrated circuit component 31 is configured so that an electronic circuit that amplifies an output signal from silicon microphone 28 is structured. Connecting wire 8 is for feeding power to wire substrate 4 and deriving the output signal from silicon microphone 28 to the outside. Hole 9 is a connecting wire insertion hole that is formed in housing 3. Partition 10 having a pipe shape is disposed around first integrated circuit component 30 inside housing 3. Partition 10 is disposed between an upper surface of wire substrate 4 and a rear surface of housing 3 to separate enclosed space A between sound hole 2 and silicon microphone 28 from enclosed space B between connecting wire insertion hole 9 and the inside of housing 3.

Figure 13A:
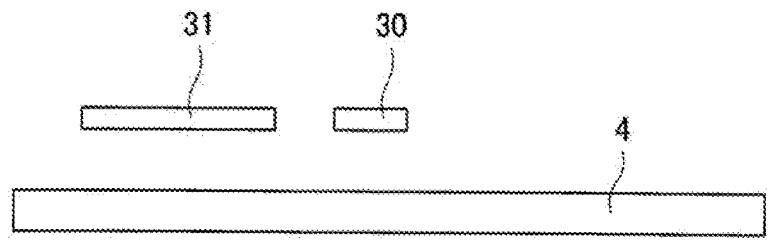
FIG. 13A is an assembly process chart of the microphone unit according to the sixth exemplary embodiment.
Figure 13B:
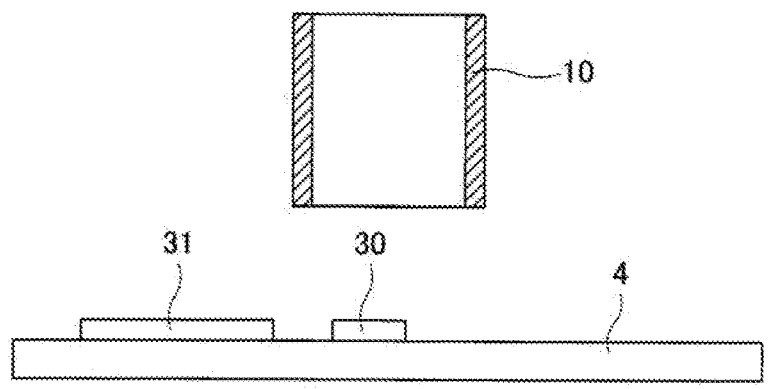
FIG. 13B is an assembly process chart of the microphone unit according to the sixth exemplary embodiment.
Figure 13C:
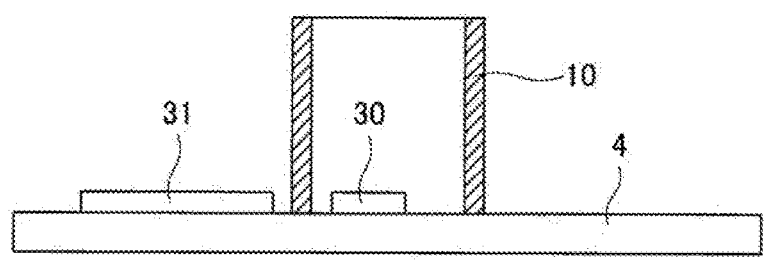
FIG. 13C is an assembly process chart of the microphone unit according to the sixth exemplary embodiment.

The mounting of the parts on wire substrate 4 is completed in steps in FIG. 13A, FIG. 13B, and FIG. 13C.

In FIG. 13A and FIG. 13B, first integrated circuit component 30 and second integrated circuit component 31 are mounted on wire substrate 4. In FIG. 13C, first integrated circuit component 30 is covered by partition 10 having the pipe shape. Wire substrate 4 in which the assembly has been completed is built in housing 3.

Figure 14A:
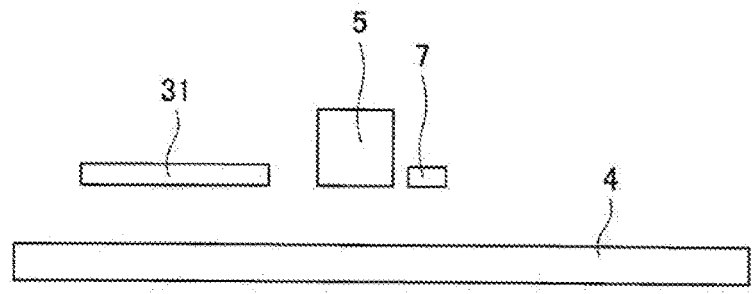
FIG. 14A is an assembly process chart of the microphone unit according to a comparative example.
Figure 14B:
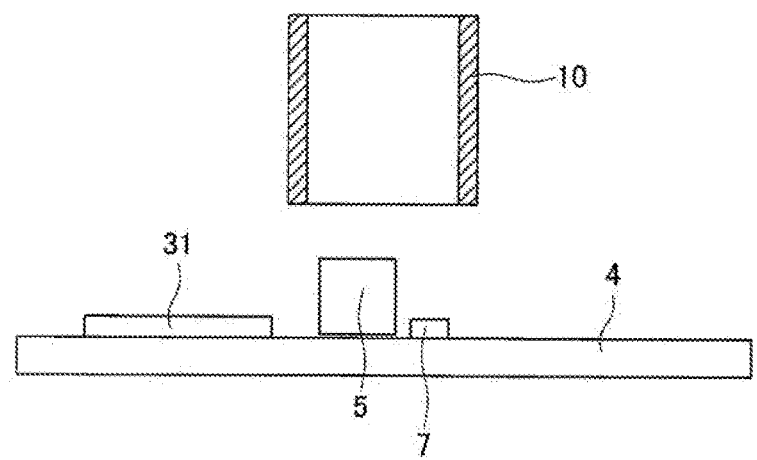
FIG. 14B is an assembly process chart of the microphone unit according to the comparative example.
Figure 14C:
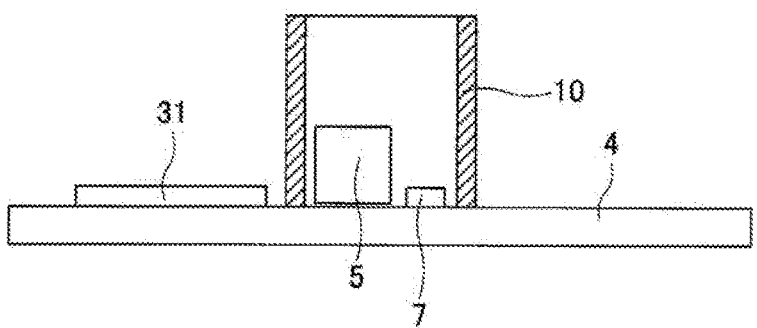
FIG. 14C is an assembly process chart of the microphone unit according to the comparative example.

FIG. 14A, FIG. 14B, and FIG. 14C illustrate a comparative example. This comparative example is a mounting step for wire substrate 4 in the microphone unit illustrated in FIG. 1 using an ECM microphone as microphone body 5.

The comparative example requires, as illustrated in FIG. 14A and FIG. 14B, work for mounting four parts including microphone body 5, second integrated circuit component 31 configured by structuring electronic circuit 6 that amplifies the output signal from microphone body 5, optical detector 7, and partition 10 on a pipe on wire substrate 4.

The steps of manufacturing the microphone unit illustrated in FIG. 13A, FIG. 13B, and FIG. 13C can be simpler than the manufacturing steps in FIG. 14A, FIG. 14B, and FIG. 14C because first integrated circuit component 30 including silicon microphone 28 and phototransistor 29 enables only three parts to be mounted on wire substrate 4.

In the noise reduction device according to the above-described exemplary embodiments, the vehicle interior of the vehicle is a noise-reduction target interior. However, the input signal in controller 17 further includes the following signal. In a case of reducing a muffled sound, a sine wave signal generated based on information about engine rotation is added. Controller 17 appropriately controls adaptive filters 17A, 17B based on the sine wave signal generated based on the information about the engine rotation and a detection signal of a sound (a noise) in the vehicle interior from the microphone. In a case of reducing a load noise, a reference signal correlated to a load noise (a noise) is added. Controller 17 appropriately controls adaptive filters 17A, 17B in any cases, based on the reference signal correlated to the load noise and the detection signal of the sound (the noise) in the vehicle interior from the microphone.

Alternatively, in the case of reducing the load noise, since the control speed is lower than that in the case of reducing the muffled sound, when controller 17 detects that sound hole 2 is blocked, the controller 17 stops updating of the adaptive filters to repeat the operation in the interpolation mode.

In the noise reduction device according to the above-described exemplary embodiments, the vehicle interior of the vehicle is the noise-reduction target interior. However, the noise reduction device is effective in a case where a cabin in a plane is the noise-reduction target interior, in an interior of a transfer device such as a ship or a train, or in a case where a microphone is used in the noise reduction device of a personal device such as an active noise-canceling headphone.

In the noise reduction device according to the above-described exemplary embodiments, the interpolation mode of the controller of the noise reduction device is a mode for maintaining a previous control state for a certain period. However, before the elapsed certain period in the interpolation mode, the similar effect can be expected by returning from the interpolation mode to the normal mode in the following cases where an interruption instruction is detected:

a case where a determination is made that the light level is higher than or equal to the setting value;

a case where a determination is made that the headlights are turned on; and a case where a determination is made that time advances and it is getting dark outside.

In the above-described exemplary embodiments, the interpolation mode of the controller of the noise reduction device is the mode for maintaining a previous control state for a certain period. However, much the same is true on:

a mode in which the control sound output fades out;

a mode in which a plurality of microphones is provided and control is made for a set of microphones excluding a microphone in which abnormality is detected; and a mode in which a stabled state is obtained by weakening the noise-reduction function through temporary reduction in a step parameter that is a parameter for adjusting an updating amount when the adaptive filter is updated.

In the above-described exemplary embodiments, the microphone unit is connected to the controller of the noise reduction device, but the microphone unit is effectively used by connecting to another device as described below, for example:

a case where the microphone unit is used in a voice recognition device;

a case where the microphone unit is used in a hands-free communication device;

a case where the microphone unit is used in an audio conference device such as a speakerphone; and a case where the microphone unit is used in a telecommunications device such as a telephone or a transceiver.

INDUSTRIAL APPLICABILITY

The present invention contributes to realization of the stable operation of various kinds of noise reduction devices.

REFERENCE MARKS IN THE DRAWINGS 1, 1a, 1b: microphone unit
2: sound hole
3: housing
4: wire substrate
5, 5a, 5b: microphone body
6: electronic circuit
7, 7a, 7b: optical detector
8: connecting wire
9: connecting wire insertion hole
10: partition
A, B: enclosed space
11: noise reduction device
12: roof panel of vehicle
13: vehicle interior
14: upholstery
15: gap
16: decoration
17: controller
17A, 17B: adaptive filter
18: headlight
19: parking light
20: illumination information
21: connecting unit
22, 23: lighting switch
24, 24a, 24b: speaker
25, 26: light-emitting diode
Ct, Ct-a: control sound
Cat, Cat-a: control sound
Cbt, Cbt-a: control sound
M: reference signal
R1, R2, R3: routine
27: obstacle
28: silicon microphone
29: phototransistor
30: first integrated circuit component
31: second integrated circuit component
32: annual calendar
33: clock
34: sunrise time and sunset time
35: current time

The invention claimed is:

1. A noise reduction device comprising:
a microphone unit that detects a noise in a noise-reduction target interior;
a controller that generates a control signal based on the noise detected by the microphone unit; and
a speaker that converts the control signal and outputs a control sound that reduces the noise to the noise-reduction target interior,
wherein the microphone unit includes
a housing having a sound hole,
a microphone body that is built in the housing and detects a sound entering the housing via the sound hole,
an optical detector that is built in the housing and detects light entering the housing via the sound hole,
wherein the controller
operates in a normal mode in which the control sound obtained by processing a reference signal for detecting a cause of a reduction target, based on the noise detected by the microphone body is output when a light detection level of the optical detector is higher than or equal to a setting level, and
operates in an interpolation mode in which a reference signal processing state is maintained in the normal mode immediately previous to the interpolation mode for a prescribed period when the light detection level of the optical detector is less than the setting level.

2. The noise reduction device according to claim 1, wherein the noise-reduction target interior is a vehicle interior of a vehicle, and wherein the controller operates in the normal mode even when the light detection level of the optical detector is less than the setting level in a case where a detection is made that a light of the vehicle is on.

3. The noise reduction device according to claim 1, wherein the controller operates in the normal mode after sunset even when the light detection level of the optical detector is less than the setting level, based on a sunrise time and a sunset time for each season in an annual calendar.

4. The noise reduction device according to claim 1, wherein the microphone unit is one of a plurality of the microphone units, and the optical detector is one of a plurality of the optical detectors, and wherein the controller operates in the normal mode when the light detection level of the optical detector in at least one of the plurality of the microphone units is higher than or equal to the setting level, and operates in the interpolation mode when light detection levels of all the plurality of the optical detectors in the plurality of the microphone units are less than the setting level.

5. A noise reduction device comprising:

a microphone unit that detects a noise in a noise-reduction target interior;

a controller that generates a control signal based on the noise detected by the microphone unit; and a speaker that converts the control signal and outputs a control sound that reduces the noise to the noise-reduction target interior, wherein the microphone unit includes a housing having a sound hole, a microphone body that is built in the housing and detects a sound entering the housing via the sound hole, and an optical detector that is built in the housing and detects non-visible light entering the housing via the sound hole, wherein a light source that emits non-visible light detectable by the optical detector is disposed in the noise-reduction target interior, separately from the microphone unit, and wherein the controller operates in a normal mode in which the control sound obtained by processing a reference signal for detecting a cause of a reduction target based on the noise detected by the microphone body is output when a light detection level of the optical detector is higher than or equal to a setting level, and operates in an interpolation mode in which a reference signal processing state is maintained in the normal mode immediately previous to the interpolation mode for a prescribed period when the light detection level of the optical detector is less than the setting level.

* * * * *